United States Patent [19]
Braswell

[11] 4,104,165
[45] Aug. 1, 1978

[54] WATER SOFTENING SYSTEM

[76] Inventor: John W. Braswell, 712 S. West End Blvd., Cape Girardeau, Mo. 63701

[21] Appl. No.: 699,215

[22] Filed: Jun. 24, 1976

[51] Int. Cl.² .......................................... B01D 23/24
[52] U.S. Cl. .................................. 210/191; 210/134; 210/140; 210/19
[58] Field of Search .................. 210/19, 35, 140, 136, 210/134, 191, 278

[56] References Cited

U.S. PATENT DOCUMENTS

| | | | |
|---|---|---|---|
| 3,217,885 | 11/1965 | Johnson | 210/134 |
| 3,286,840 | 11/1966 | Staats | 210/134 |
| 3,333,699 | 8/1967 | Bliss et al. | 210/134 |
| 3,342,336 | 9/1967 | Rose | 210/134 |
| 3,380,590 | 4/1968 | Grayson | 210/134 |
| 3,385,441 | 5/1968 | Lyall | 210/134 |
| 3,509,998 | 5/1970 | Pellett et al. | 210/134 |
| 3,531,402 | 9/1970 | Thompson | 210/35 |
| 3,779,281 | 12/1973 | Brane | 210/191 |

*Primary Examiner*—Charles N. Hart
*Assistant Examiner*—E. Rollins Cross
*Attorney, Agent, or Firm*—Cohn, Powell & Hind

[57] ABSTRACT

The water softening system hereof employs a treatment tank containing a mineral bed of ion-exchange resin granules, a brine tank, and valve means for periodically cycling water through the mineral bed for removing hardness and other undesirable factors therefrom, then passing a saturated brine solution through the bed counter-current to its normal service flow to recondition it, and subsequently flushing the bed to cleanse the granules and remove all undesirable matter therefrom. The control means for the system includes electrically operated solenoid diaphragm valves, and a plunger valve responsive to water pressures, for controlling and regulating the flow of water and brine through the mineral bed. Venturi aspirator means are incorporated in the plunger valve, whereby a saturated brine solution is drawn, in a direction counterflow to service flow through the mineral bed, whereafter the bed is flushed with water in successive counterflow and concurrent flow directions, thus to cleanse, rinse and resettle the bed in preparation for the subsequent service cycle.

7 Claims, 8 Drawing Figures

SERVICE CYCLE

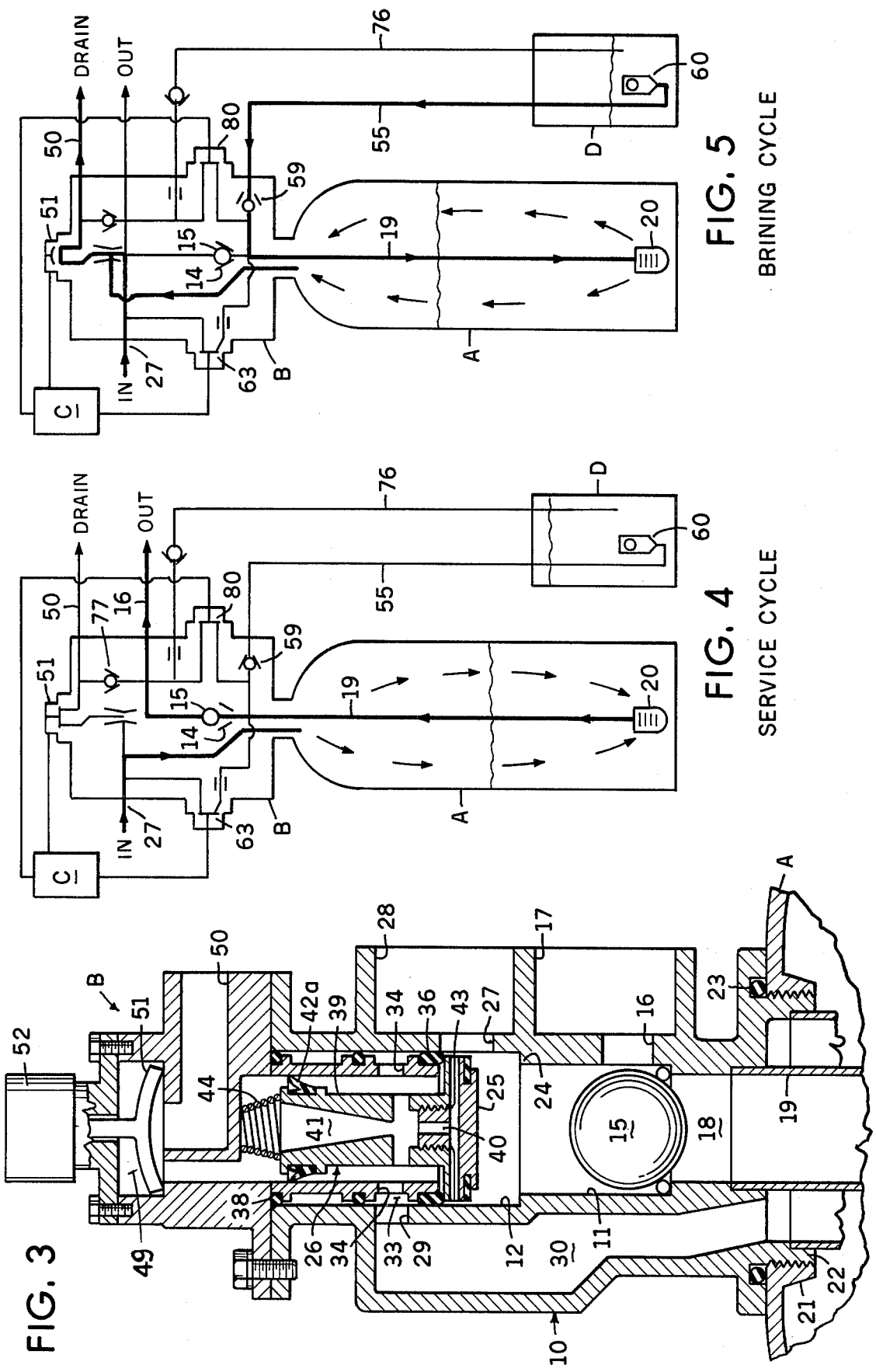

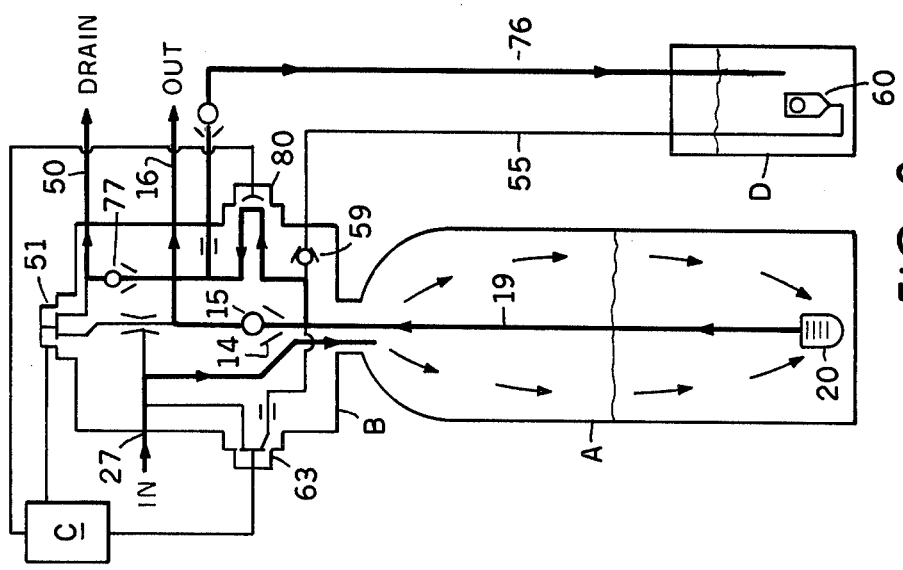
FIG. 8 RINSE AND BRINE REFILL
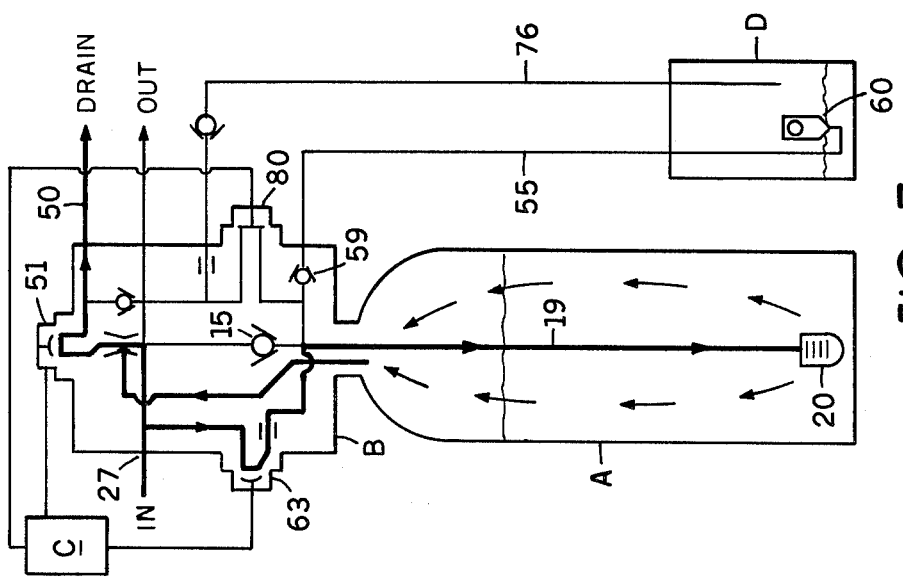
FIG. 7 FLUSHING CYCLE CONTINUOUS FLOW
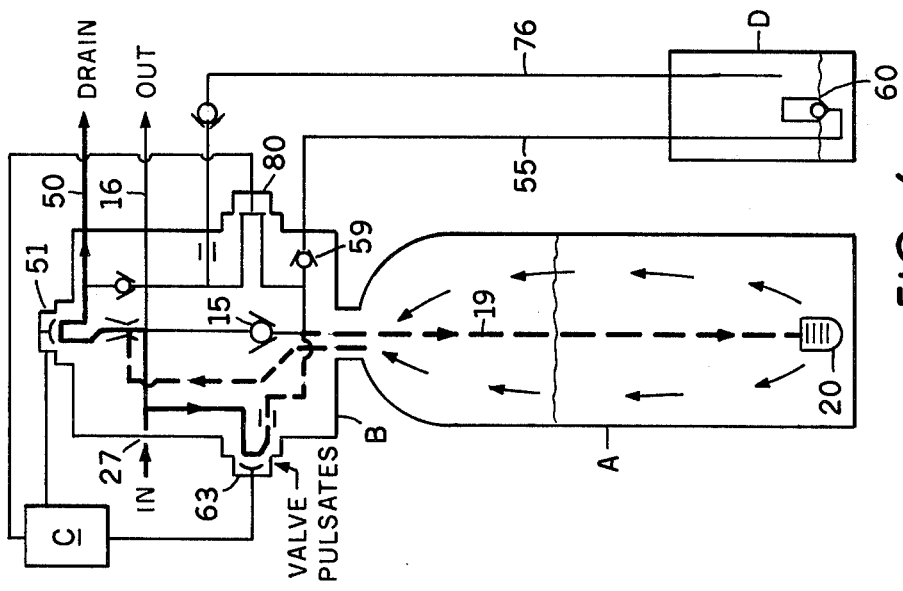
FIG. 6 FLUSHING CYCLE PULSATE ACTION

4,104,165

WATER SOFTENING SYSTEM

BACKGROUND AND SUMMARY OF THE INVENTION

This invention relates to ion-exchange and filter water systems and has particular reference to an improved method and means for controlling the flow of water and regenerative fluids through an ion-exchange resin bed, in such systems.

In ion-exchange water treatment systems which employ beds of synthetic resin for removing hardness factors, iron and turbidity from water supplied thereto, it has been the practice to recondition or regenerate the bed following a period of service with the use of brine which, in somewhat diluted condition is forced downwardly through the bed, flowing in the same direction through the bed as does water during the service cycle of operation. Water treatment systems which operate in the manner outlined above have certain undesirable characteristics which are especially manifest when used for treating water high in iron content. The downward flow of the regenerating solution causes iron oxide to accumulate and become trapped in the lower regions of the resin bed, thereby necessitating complete removal of the bed for cleaning purposes at frequent intervals. Another disadvantage of former systems is that the diluted brine which reaches the mineral bed is much less efficient for rejuvenating the bed than is the full strength, concentrated brine or regenerants which act upon the resins or mineral in the system of the present invention.

Among the objects of the present invention is to provide an improved system for regenerating the mineral bed after a period of service whereby the minerals are restored to a higher degree of ion-exchange efficiency, the time required for the regeneration process is reduced, iron oxide particles are not retained and permitted to grow to the point where they clog the mineral bed, and the degree of salinity of the regenerative brine does not vary in marked degree with changes in the pressure of the water supply.

Yet another object of the invention is to provide for the use of treated water for the makeup of the brine solution, the treated water being introduced into the brine tank in such a way that the salt particles act as a filter for the saturated brine solution as it passes through the salt bed and to the mineral bed, whereby to prevent the entry of sand and other undesirable non-soluables that are normally found in various grades of salt, from entering into the treatment tank.

An important object of the invention is to draw concentrated brine upwardly through the mineral bed, counter-current to its service flow after which water pressure is applied to the effluent to cause its discharge to a drain which may be at a level above the treatment apparatus.

The foregoing and other objects and advantages are achieved by an improved control valve and brine induction provisions, which, under the dictates of a timer or sensor device and electrical solenoid valves controlled thereby, direct raw or untreated water downwardly through a bed of zeolites or other ion-exchange resins or minerals for a predetermined service period; or, with use of a device which senses the physical condition and hence the operating efficiency of the bed, cause regeneration of the bed to occur in a series of steps or cycles. The first of these is to draw concentrated brine or regenerant into the treatment tank, slowly, upwardly through the mineral bed. Following the brining operation, an upflow fast rinse cycle and an upflow washing cycle occur, and finally a fast down-flow rinse of the bed to remove all traces of regenerant solution and any turbidity of iron deposits in the mineral bed where the iron bearing waters are treated. Therefore the system is restored to the normal service cycle wherein the raw water is caused to flow downwardly through the regenerated mineral bed.

BRIEF DESCRIPTION OF THE DRAWING

FIG. 3 is a sectional view through the valve assembly, similar to FIG. 1, but with the main valve parts shown in positions for regenerating or brining the mineral bed;

FIG. 4 is a diagrammatic view of the entire unit with valve parts illustrated in their service position;

FIG. 5 is a view similar to that of FIG. 4 with the valve parts shown in their positions for brining;

FIG. 6 is a diagrammatic showing of the unit with valve parts illustrated in positions for intermittent or pulsing counterflow washing of the mineral bed;

FIG. 7 illustrates the unit with valve parts shown in a second, continuous counterflow wash of the mineral bed, and FIG. 8 illustrates the system with valve parts shown in position for effecting a concurrent flushing of the mineral bed and for refilling the brine tank with treated water.

DESCRIPTION OF THE PREFERRED EMBODIMENT

Figure 2:
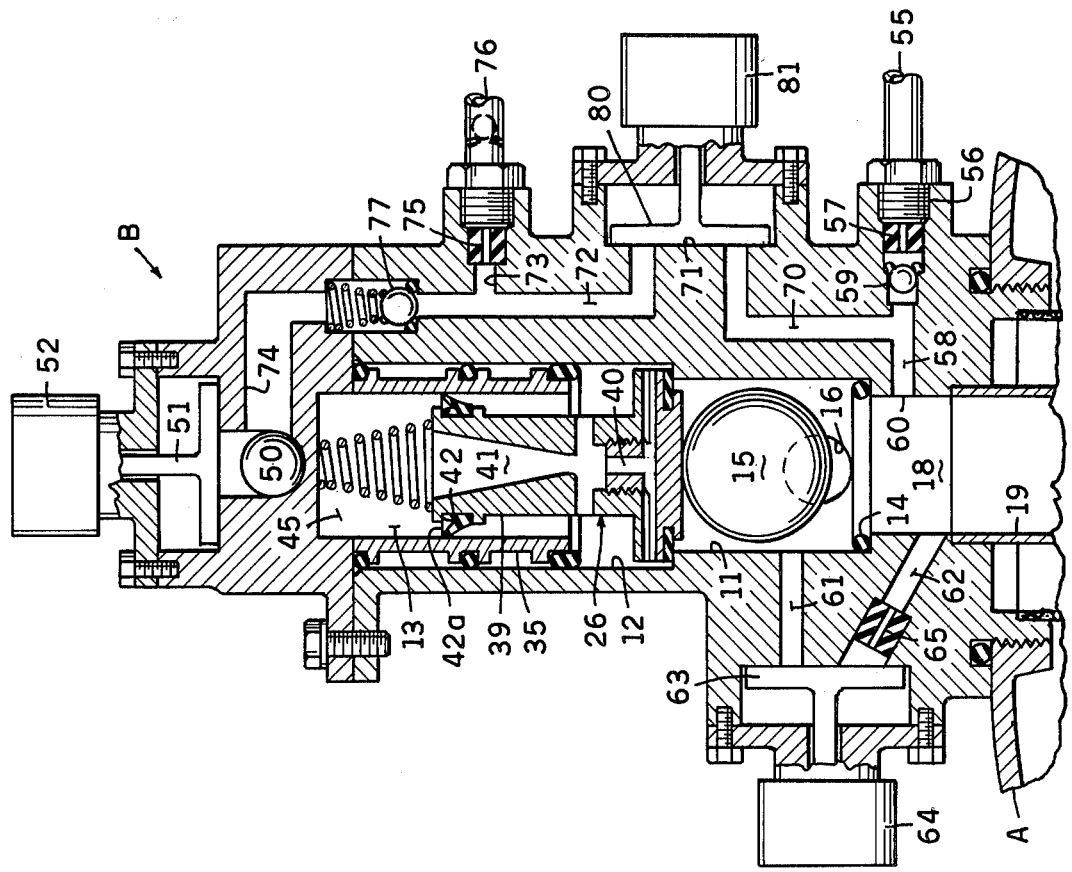
FIG. 2 is a vertical sectional view through the valve assembly with the main valve parts shown in their service positions, as in FIG. 1, the plane of the section in FIG. 2 being at a right angle to that of FIG. 1.
Figure 1:
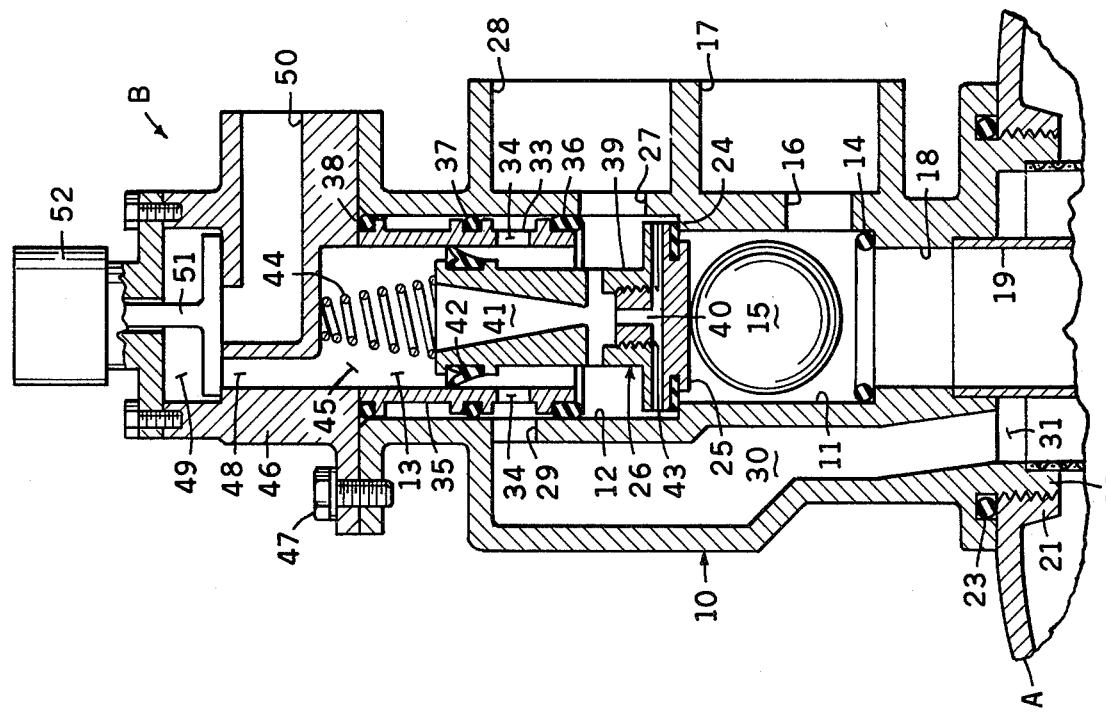
FIG. 1 is a vertical sectional view through the valve assembly and upper portion of the treatment tank upon which it is mounted, valve parts being shown in their normal or service positions.

The water treatment apparatus hereof comprises a vertically elongated treatment tank A which is surmounted by a unitary valve assembly indicated generally at B and shown in detail in FIGS. 1, 2 and 3. A control unit C controls the operation of solenoid valves of the valve assembly B. A separate tank or container for salt and brine is designated D. Resin tank A may be located above or below a sewer drain because by-products of the treatment process are discharged under pressure from the system, as will hereinafter be more fully explained. Tank A contains a bed Z of granular ion-exchange resin or mineral, such bed desirably occupying from one-half to two-thirds of the volumetric capacity of the tank.

Referring now to FIGS. 1, 2 and 3 showing the valve assembly B in detail, this unit comprises a body member 10 formed to provide a series of vertical, coaxial, end-adjoining chambers of stepped diameter, 11, 12 and 13. The lowermost chamber 11 rises above an internal annular shoulder that supports an O-ring 14 which serves as a valve seat for a ball valve 15. An opening 16 in the wall of chamber 11, immediately above the valve seat 14, communicates with an outlet pipe nipple 17.

Extending axially downwardly from chamber 11 is a cylindrical passage 18 which continues downwardly through a standpipe 19 located centrally within tank A. Stand-pipe 19 terminates near the bottom of the tank and at the lower end of pipe 19 there is provided a slotted strainer head 20 which serves to retain ion-exchange granules in tank A during periods of fluid upflow in pipe 19, and to distribute regenerant fluids evenly throughout the resin bed during periods of fluid downflow through pipe 19, conditions which occur during different operating cycles as will subsequently appear. Coacting threaded collars 21 and 22 respectively on the lower end of the valve body and the upper end of the tank A connect these parts together, and a sealing ring 23 interposed between mating flange surfaces of the valve body and tank top prevents leakage at the connection.

The middle chamber 12 rises above an annular inner shoulder 24 that provides a seat for the poppet type valve-head 25 of a plunger valve assembly 26. When in the down position shown in FIGS. 1 and 2, poppet valve-head 25 seats on shoulder 24, whereby to prevent the direct passage of water between chambers 11 and 12. Chamber 12 has a lateral intake passage 27 located in a chamber wall closely above the valve seat shoulder 24. Passage 27 communicates directly with pipe nipple 28 formed integrally on the body part 10 immediately above the outlet nipple 17. Nipple 28 serves as a connection means for a service water pipe (not shown) that supplies raw or untreated water to the system.

A wall opening 29 above and on the side of chamber 12 opposite to opening or passage 27 connects that chamber 12 to the upper end of a vertical passageway 30, the lower end of which communicates with the interior of tank A at an opening 31 exteriorly of stand pipe 19.

A sleeve member 35 is fixedly held in place within the upper end portion of body casting 10 by three sealing rings, 36, 37 and 38. The lowermost ring 36 protrudes below this lower end of sleeve 35 and provides a valve seat which is engageable by the upper perimetral surface of poppet valve head 25 when the latter is disposed in its uppermost position, as shown in FIG. 3. The upper ring 38 provides a seal between the body casting 10 and a head casting, to be hereinafter described. A number of radial wall passages 34 in sleeve 35 (FIGS. 1 and 2) have their outer ends opening to an annular groove 33 in the outer surface of the sleeve, which groove confronts and is in communication with opening 29 in the body casting.

Valve assembly 26 includes a stem portion 39 rising from the poppet head 25. The stem 39 is formed with a venturi passage extending vertically and concentrically therethrough which includes a nozzle element 40 arranged to direct a jet or stream vertically through an aspirator space and into the lower end of venturi throat 41. The upper or outlet end of throat 41 is directed into the chamber 13, which chamber is separated from lower chamber 12 by the flexible skirt 42a of a sealing ring 42 carried by the valve stem 39 near its upper end. The flexible skirt 42a of sealing ring 42 acts in the manner of a check valve that permits upward flow from chamber 12 to chamber 13 but prevents flow in the opposite direction.

The jet nozzle 40 is supplied with fluid under pressure from chamber 12 through radial passages 43 in the poppet head, the poppet head being suitably dimensioned to provide a passage space between it and the cylindrical wall of chamber 12. Whereas the plunger valve assembly is movable between upper and lower limit positions (FIGS. 3 and 1 respectively) by differences in fluid pressure acting on its upper and lower surfaces, as will be hereinafter explained, it is desirable to provide a compression spring 44 that acts downwardly on the valve in order to move the valve to its downward position when water pressures on the opposite end surfaces are substantially equal.

Chamber 13 opens upwardly into a cavity 45 formed in the underside of a head casting 46 which is secured to the body casting 10 by suitable cap screws, such as the one indicated at 47. A vertical passage 48 leads from cavity 45 and chamber 13 to a valve chamber 49. A drain passage 50 leads away from valve chamber 49 and is connected to a drain pipe, not shown, that leads to a sewer. Fluid flow from passage 48 to drain passage 50 is controlled by a solenoid actuated valve 51. When its solenoid 52 is energized, valve 51 moves to open position.

Numeral 55 (FIG. 2) designates a pipe through which saturated brine is forced by atmospheric pressure from brine tank D into the valve assembly B. Brine pipe 55 is joined by a threaded nippe 56 to passage 58 containing a flow control orifice 57 (FIG. 2) and a check valve 59 in passage 58 to communicate with chamber 18, and therethrough with the upper end of stand pipe 19. Brine conduit 55 passes saturated brine from a point near the bottom of the tank D, the inlet passage to pipe 55 being controlled by a float valve assembly 60 which closes the inlet end of line 55 when brine in tank D drops below a predetermined level, as appear in FIG. 6.

For purposes of cleansing the mineral bed following a brining operation water is introduced into the upper end of the stand pipe 19 and caused to flow downwardly therethrough, outwardly through strainer head 20, upwardly through the resin bed Z and thence through the valve assembly to the drain, as will be hereinafter more fully explained. The washing and rinsing cycles occur with ball valve 15 seated on its valve seat sealing ring 14, as shown in FIG. 3. A by-pass passage 61–62, (FIG. 2), from chamber 11 to the upper end of stand pipe 19 is controlled by a solenoid valve 63, which opens in response to energization of its associated solenoid 64. A flow control orifice element 65 is desirably installed in passage 62. Element 65 serves to regulate the flow rate during the mineral bed cleansing operations.

Again with reference to FIGS. 2 and 8, valve means and passages are shown whereby a final, concurrent-flow rinsing of the mineral bed is obtained and simultaneously, the brine tank is refilled with water to prepare saturated brine for a subsequent bed regenerating operation. Numeral 70 designates a water passageway in a side wall of the body member which provides a connection between the brine passage 58 and a valve chamber 71. An exit passage 72 from valve chamber 71 leads to two branch passages 73 and 74. Branch line 73 has a flow control orifice element 75 therein, and is connected to a brine tank refill pipe 76 leading to the brine tank D. The branch passage 74 leads to drain passage 50 and is provided with a check valve 77 to assure unidirectional flow toward drain 50, preventing back flow from the drain into the system. Fluid flow in the passage 70-72 is controlled by a valve member 80 in chamber 71. This valve member is normally disposed in passage closed position and is actuated to open position as shown in FIG. 2 by the energization of solenoid 81.

OPERATION

With special reference to FIG. 4, the system is conditioned for normal service operation by the closing of the solenoid flow control valves 51, 63 and 80, effected by suitable switching means in the master control panel C. Such means may be controlled by timing mechanism, supplemented by sensor means for controlling valve operation responsively to the physical or chemical state of the mineral bed.

SERVICE CYCLE

With reference to FIGS. 1 and 4, during a service cycle of operation raw water flows through an inlet opening 27 (FIG. 1) into the middle chamber 12 of the valve assembly. The water passes upwardly between the stem 26 of the plunger and sleeve 35, thence outwardly through a ring of peripheral openings 34 in the sleeve and an opening 29 that leads into the passage 30 wherein it descends into the treatment tank A through opening 31. The raw water then perolates downwardly through the mineral bed, loosing its hardness factors by the ion-exchange process, and enters the screening head 20 at the lower end of the stand pipe 19. Traveling upwardly through stand pipe 19 the treated water raises valve ball 15 from its seat 14, and the treated water exits from the system through the outlet port 16.

During this service cycle the plunger valve 26 is held in its downward position as shown in FIG. 1 by water pressure in chamber 12 being greater than that in the underlying chamber 11 due to a drop in pressure as the water passes through the mineral bed. Fluid above the flexible sealing ring 42 is static (valve 51 being closed) and tends only to increase the downward pressure of the poppet head and seal 25 on the valve seat shoulder 24.

BRINING CYCLE

The brining cycle is initiated in response to the timer or sensor device which causes solenoid 52 to become energized, thereby opening drain valve 51. (Solenoid valves 64 and 81 remain closed). This releases water from upper chambers 13, 48 and 49 to drain passage 50, causing a lowering of water pressure in these chambers below the pressure being exerted on the underside of the valve. This causes the plunger assembly to be raised to its upper position shown in FIG. 3. The seating of the poppet head on the sealing ring 36 closes off flow of water through the plunger except for such water that enters the orifice nozzle 40 and exits therefrom as a jet stream, passing through the venturi throat and into chamber 45 and thence to drain passage 50. This high pressure jet of water, discharging into and through the venturi throat creates negative pressure at the opening 29 which then becomes an intake port for fluid drawn from the treatment tank. As regenerant is forced by atmospheric pressure out of the treatment tank the lowered pressure in stand pipe 19 causes check valve 15 to become seated on sealing ring 14, and held in closed position by water pressure from above. As appears in FIG. 3, inlet passage 27, chamber 12, chamber 11 and outlet passage 16 form a short circuit by-pass for raw or untreated water which will be available from service faucets during the regeneration process.

The above described aspirative effect of the venturi means creates a negative pressure in the tank of resin and inducts saturated brine from the brine tank through pipe 55, open check valve 59, port 60 in sub-chamber 18, stand pipe 19 and distributor 20. The brine percolates slowly upwardly through the mineral bed Z, passage 30 port 29 at the upper end of passage 30 into and through the venturi throat. The brine effluent, pressurized by the jet stream from nozzle element 40, is discharged at a relatively high velocity through the open valve chamber 49 to the drain passage 50. This brining cycle continues for a predetermined length of time, or until the brine level in tank D falls below the check valve assembly 60 in the brine tank, as shown diagrammatically in FIG. 6.

WASH CYCLE

Following the brining cycle previously described in the control means causes solenoid valve 63 to open, and drain valve 52 to remain open. The opening of solenoid valve 63 allows water to flow from chamber 11 through passage 61 and 62 (FIG. 2) into and downwardly through stand pipe 19, thence upwardly through the mineral bed and through the passages to drain as explained in connection with the description of the brining cycle above. The flow control element 65 has a bore passage that yields a relatively high flow rate of water passing into and through the mineral bed, expanding the bed and enabling the individual granules to be well washed, rinsed and freed of turbidity.

The flow rate during this initial bed cleansing cycle is considerably greater than the flow rate of brine through the mineral bed during the brining cycle. This is due to the fact that the brine which is passed through the mineral bed enters the system under something less than atmospheric pressure. The rinse water during this cycle enters the system and the mineral bed at a reduced pressure as that of the water main as the aspirator continues to depressurize the tank.

The flexible character of the sealing ring 42 accommodates the increased flow of wash water out of the system during this cycle. Thus, the upwardly directed skirt portion 42a of the sealing ring 42 becomes displaced inwardly by underlying water pressure, increasing the passage area around the plunger stem if necessary to accommodate the increased flow.

It will be understood that during both the brining and the rinse cycles previously described the plunger valve 26 is in an elevated position as appears in FIGS. 3, providing a direct connection between the raw water inlet passage 27 chambers 12 and 11, and outlet passage 26. Accordingly, water will be available in the service pipes during the brining and the first rinse cycles, although the water supplied during this period will be untreated since it does not pass through the mineral bed.

By preference the counter-flow rinse cycle above described is carried out in two stages. During the first stage valve 63 is opened and closed intermittently at approximately three second intervals, causing a pulsating upward flow of rinse water through the mineral bed, thereby tending to rinse the spent brine and loosen sedimentary deposits which have accumulated during the service and brining cycles. Such intermittent opening and closing of solenoid valve 63 may be accomplished by the provision of a so-called bi-metal flasher switch in the supply circuit for solenoid 64. The pulsating operation of valve 63 is discontinued after a predetermined length of time, as controlled by the timer device, through a subordinate switch that closes a shunt circuit around the flasher switch.

During the second stage or phase of the wash cycle the pulsating action of valve 63 is discontinued and the wash water flows in a fast, uninterrupted stream through the bed, carrying with it the freed particles and turbidity to the drain.

RINSE AND BRINE TANK REFILL

In the final stage of bed regeneration solenoid valves 51 and 63 are closed and solenoid valve 80 is open. With the valves positioned in this manner water enters the treatment tank above the resin bed, flows downwardly through the bed to remove therefrom any remaining salinity. This concurrent or downflow rinsing operation tends to compact or concentrate the bed, which has been expanded by the previous counter-flow brining and flushing operations, thusly conditioning the bed for the subsequent service and filtering cycle.

During the final rinse cycle the brine tank is refilled with soft water from the treatment tank. The flow paths are as follows: closing valves 51 and 53, and opening valve 80 effects a slight reduction of pressure on the underside of the plunger 26. Spring 44 initiates downward movement of the plunger and causes it to resume its downward, service position shown in FIG. 2. Consequently, raw water flows into the treatment tank through passage 30, as it does during the service cycle, thence downwardly through the resin bed and upwardly through stand pipe 19 to chamber 18 (FIG. 2). With valve 80 open the treated water moves through passages 58, 70, 71, 72 and into passage 73 leading to brine tank refill pipe 76. After the brine tank has been refilled any excess flow prior to the closing of valve 80 is discharged through check valve 77 to passages 74 and 50 to the drain. Closing of solenoid valve 80 responsively to the timer or sensor device conditions the system for normal service operation.

I claim:

1. In a water treatment system having a treatment tank and an ion-exchange mineral bed therein, and a brine tank, regeneration control apparatus comprising:
   (a) a plunger valve means including an aspirator for producing a flow of fluid,
   (b) a raw liquid inlet port, and a treated liquid outlet port,
   (c) a first conduit means connecting the raw liquid inlet port to the top of the treatment tank in a first position of the plunger valve means,
   (d) a second conduit means connecting the treated liquid outlet port to the lower interior of the treatment tank,
   (e) a drain port and a drain valve means for opening or closing the drain port, the drain port being connected to the first conduit and the raw liquid inlet port through the aspirator in the plunger valve means in a second position of the plunger valve means when the drain valve means is open,
   (f) a third conduit means connecting the raw liquid inlet port to the second conduit means,
   (g) a wash valve means for opening or closing the third conduit means,
   (h) a brine tank inlet port and a brine tank outlet port, and separate conduit means connecting each of the last said ports separately to the brine tank to provide one conduit means for delivering brine from the brine tank and another separate conduit means for delivering treated liquid to the brine tank,
   (i) a fourth conduit means connecting the brine tank inlet and outlet ports to the second conduit means,
   (j) a brine valve means in the fourth conduit between the brine tank inlet and outlet ports for controlling flow therethrough,
   (k) means maintaining the drain valve means, wash valve means and brine valve means closed in the service cycle for water flow from the raw liquid inlet port, through the first and second conduit means and in one direction through the mineral bed, and through the treated liquid outlet port,
   (l) the last said means maintaining the drain valve means open, and the wash valve means and brine valve means closed in the brining cycle for water flow from the raw liquid inlet port and through the aspirator in the plunger valve means to the drain port, and for concurrent brine flow from the brine tank inlet port, through the fourth, second and first conduit means and in the opposite direction through the mineral bed, and to the drain port through the aspirator in the plunger valve means,
   (m) the last said means maintaining the drain valve means and the wash valve means open, and the brine valve means closed in the wash cycle for water flow from the raw liquid inlet port through the aspirator in the plunger valve means to the drain port, and for concurrent water flow from the raw liquid inlet port, through the second and first conduit means and through the mineral bed in the same direction as the brine flow through the mineral bed in the brining cycle, and through the aspirator in the plunger valve means to the drain port whereby to remove the brine, and
   (n) the last said means maintaining the drain valve means and the wash valve means closed, and the brine valve means open in the rinse and brine tank refill cycle for liquid flow from the raw liquid inlet port, through the first, second and fourth conduits, and to the brine tank outlet port.

2. A regeneration control apparatus as defined in claim 1, in which:
   (o) the last said means opens and closes the wash valve means intermittently during the wash cycle to provide a pulsating liquid flow through the ion-exchange mineral bed in the same direction as the brine flow through the bed during the brining cycle.

3. A regeneration control apparatus as defined in claim 1, in which:
   (o) the last said means opens and closes the wash valve means intermittently during the initial phase of the wash cycle to provide a pulsating liquid flow through the ion exchange mineral bed in the same direction as the brine flow through the bed during the brining cycle, and then maintains the wash valve means open during the remaining phase of the wash cycle to provide a substantially constant liquid flow through the mineral bed in the same direction as the brine flow through the bed during the brining cycle.

4. A method of regenerating a water treatment system having a treatment tank and an ion-exchange mineral bed therein, and a brine tank, comprising the steps of:
   (a) connecting the raw liquid to a water supply system with means in the path for causing a flow in one direction through the mineral bed during a service cycle,
   (b) connecting the brine tank to a drain with means in the path for causing brine flow in a counter-direction through the mineral bed during a brining cycle,
   (c) connecting the raw liquid to the drain with means in the path for causing liquid and brine flow in the same said counter-direction through the mineral bed during a wash cycle to remove the brine, and (d) connecting the raw liquid to the brine tank with means in the path for causing liquid flow in the said one direction through the mineral bed during a rinse and brine tank refill cycle.

5. A method of regenerating a water treatment system as defined in claim 4, including the step of:

(e) pulsating the liquid flow through the mineral bed during the wash cycle.

6. A method of regenerating a water treatment system as defined in claim 4, including the steps of:

(e) pulsating the liquid flow through the mineral bed during the initial phase of the wash cycle, and (f) then maintaining a substantially constant liquid flow through the mineral bed during the remaining phase of the wash cycle.

7. A method of regenerating a water treatment system as defined in claim 4, including the steps of:

(e) feeding the brine flow from the brine tank to the mineral bed during the brining cycle through one path leading from the brine tank, and (f) feeding the treated liquid flow from the mineral bed to the brine tank during the brine tank refill cycle through another separate path leading to the brine tank.

* * * * *